(12) United States Patent
Murakami et al.

(10) Patent No.: US 8,800,055 B2
(45) Date of Patent: Aug. 5, 2014

(54) NODE CONTROLLER FOR AN ENDPOINT IN A CLOUD COMPUTING ENVIRONMENT

(75) Inventors: Shaun T. Murakami, San Jose, CA (US); John Reif, Redwood City, CA (US)

(73) Assignee: International Business Machines Corporation, Armonk, NY (US)

( * ) Notice: Subject to any disclaimer, the term of this patent is extended or adjusted under 35 U.S.C. 154(b) by 527 days.

(21) Appl. No.: 12/908,132

(22) Filed: Oct. 20, 2010

(65) Prior Publication Data
US 2012/0102572 A1   Apr. 26, 2012

(51) Int. Cl.
*H04L 9/32* (2006.01)
*G06F 9/50* (2006.01)
*G06F 9/54* (2006.01)

(52) U.S. Cl.
CPC ............. *G06F 9/546* (2013.01); *G06F 9/5061* (2013.01)
USPC ............................................ 726/28; 713/168

(58) Field of Classification Search
None
See application file for complete search history.

(56) References Cited

U.S. PATENT DOCUMENTS

| | | | | |
|---|---|---|---|---|
| 6,202,080 | B1 * | 3/2001 | Lu et al. | 718/105 |
| 7,010,602 | B2 * | 3/2006 | Poindexter et al. | 709/226 |
| 7,542,468 | B1 * | 6/2009 | Begley et al. | 370/389 |
| 7,644,410 | B1 | 1/2010 | Graupner et al. | |
| 8,495,356 | B2 * | 7/2013 | Ashok et al. | 713/150 |
| 2002/0143915 | A1 * | 10/2002 | Mathieson | 709/223 |
| 2004/0240458 | A1 * | 12/2004 | T V et al. | 370/412 |
| 2005/0040223 | A1 * | 2/2005 | Yigit et al. | 235/376 |
| 2005/0210331 | A1 * | 9/2005 | Connelly et al. | 714/26 |
| 2006/0167968 | A1 * | 7/2006 | Reynolds et al. | 709/202 |
| 2007/0005536 | A1 * | 1/2007 | Caswell et al. | 706/20 |
| 2007/0143430 | A1 * | 6/2007 | Johnson et al. | 709/206 |
| 2008/0034365 | A1 * | 2/2008 | Dahlstedt | 718/1 |
| 2009/0089078 | A1 * | 4/2009 | Bursey | 705/1 |
| 2010/0042720 | A1 * | 2/2010 | Stienhans et al. | 709/226 |
| 2010/0088205 | A1 * | 4/2010 | Robertson | 705/34 |
| 2010/0131948 | A1 | 5/2010 | Ferris | |
| 2010/0153482 | A1 | 6/2010 | Kim et al. | |
| 2010/0198972 | A1 | 8/2010 | Umbehocker | |
| 2010/0199037 | A1 * | 8/2010 | Umbehocker et al. | 711/113 |

(Continued)

OTHER PUBLICATIONS

Maitland, J., "Keeping Control Isn't Easy", Chapter 4: Cloud-Based Infrastructure, SearchCloudComputing.com, 13 pages.

(Continued)

*Primary Examiner* — Eleni Shiferaw
*Assistant Examiner* — Phy Anh Vu
(74) *Attorney, Agent, or Firm* — William E. Schiesser; Keohane & D'Alessandro, PLLC

(57) ABSTRACT

Embodiments of the present invention provide an intelligent node controller (e.g., for an endpoint/node such as a cloud node) to process requests. Specifically, (among other things) the node controller will read a request message from a cloud node queue that is associated with the endpoint. The request message typically includes details related to a request for cloud resources and/or services received from a consumer. The node controller executes program code in an attempt to process the request. As the request is being processed, the node controller can place state messages indicating a state of fulfillment of the request on a cloud manager queue that is associated with a cloud manager from which the request message was received. In addition, the node controller can update an audit via an audit queue with the state messages. When a request cannot be processed, the node controller can place a failure message in a triage queue or the like.

19 Claims, 6 Drawing Sheets

(56) References Cited

U.S. PATENT DOCUMENTS

| | | | |
|---|---|---|---|
| 2010/0217864 A1 | 8/2010 | Ferris | |
| 2010/0217865 A1 | 8/2010 | Ferris | |
| 2010/0235887 A1* | 9/2010 | Burch et al. | 726/4 |
| 2011/0072427 A1* | 3/2011 | Garmark | 718/1 |
| 2011/0119667 A1* | 5/2011 | Srinivasan | 718/1 |
| 2011/0161952 A1* | 6/2011 | Poddar et al. | 717/173 |
| 2011/0270910 A1* | 11/2011 | Floyd et al. | 709/203 |
| 2011/0289159 A1* | 11/2011 | Delucca et al. | 709/206 |
| 2011/0302415 A1* | 12/2011 | Ahmad et al. | 713/168 |

OTHER PUBLICATIONS

Mell et al., "The NIST Definition of Cloud Computing", National Institute of Standards and Technology, Information Technology Laboratory, Version 15, Oct. 7, 2009, 2 pages.

* cited by examiner

NODE CONTROLLER FOR AN ENDPOINT IN A CLOUD COMPUTING ENVIRONMENT

TECHNICAL FIELD

The present invention generally relates to cloud computing. Specifically, the present invention relates to the processing of requests in a distributed fashion in a cloud computing environment.

BACKGROUND

The cloud computing environment is an enhancement to the predecessor grid environment, whereby multiple grids and other computation resources may be further abstracted by a cloud layer, thus making disparate devices appear to an end-consumer as a single pool of seamless resources. These resources may include such things as physical or logical compute engines, servers and devices, device memory, storage devices, etc.

Current cloud management systems use a centralized approach for controlling cloud resources (e.g., servers, virtual machines, storage devices, networking resources, etc.). Specifically, existing approaches store data about cloud hardware, software, etc. in a centralized data store and perform management actions from a centralized management system. This approach can result in: scaling issues when processing many concurrent requests; difficulties in keeping information about the environment consistent; and/or a single point of failure for cloud management requests.

SUMMARY

Embodiments of the present invention provide an (intelligent) node controller (e.g., for an endpoint/node such as a cloud node) to process requests. Among other things, the node controller will read a request message from a cloud node queue that is associated with the endpoint (e.g., any type of node such as a computing node, a storage node, etc.). The request message typically includes details related to a request for cloud resources and/or services received from a consumer. The node controller executes program code in an attempt to process the request. As the request is being processed, the node controller can place state messages indicating a state of fulfillment of the request on a cloud manager queue that is associated with a cloud manager from which the request message was received. In addition, the node controller can update an audit database via an audit queue with the state messages. When a request cannot be processed, the node controller can place a failure message in a triage queue or the like.

A first aspect of the present invention provides an intelligent node controller method for an endpoint in a cloud computing environment, comprising: reading a request message in a cloud node queue associated with the endpoint and a node controller; executing program code to process a request associated with the request message using the node controller; and placing, using the node controller, a state message indicating a state of fulfillment of the request on a cloud manager queue associated with a cloud manager from which the request message was received.

A second aspect of the present invention provides an intelligent node controller system for an endpoint in a cloud computing environment, comprising: a bus; a processor coupled to the bus; and a memory medium coupled to the bus, the memory medium comprising instructions to: read a request message in a cloud node queue associated with the endpoint; execute program code to process a request associated with the request message; and place a state message indicating a state of fulfillment of the request on a cloud manager queue associated with a cloud manager from which the request message was received.

A third aspect of the present invention provides a computer program product for intelligent node control of an endpoint in a cloud computing environment, the computer program product comprising a computer readable storage media, and program instructions stored on the computer readable storage media, to: read a request message in a cloud node queue associated with the endpoint; execute program code to process a request associated with the request message; and place a state message indicating a state of fulfillment of the request on a cloud manager queue associated with a cloud manager from which the request message was received.

A fourth aspect of the present invention provides a method for deploying a system for intelligent node control of an endpoint in a cloud computing environment, comprising: deploying a computer infrastructure being operable to: read a request message in a cloud node queue associated with the endpoint with a node controller; execute program code to process a request associated with the request message using the node controller; and place a state message indicating a state of fulfillment of the request on a cloud manager queue associated with a cloud manager from which the request message was received using the node controller.

BRIEF DESCRIPTION OF THE DRAWINGS

These and other features of this invention will be more readily understood from the following detailed description of the various aspects of the invention taken in conjunction with the accompanying drawings in which.

Figure 1:
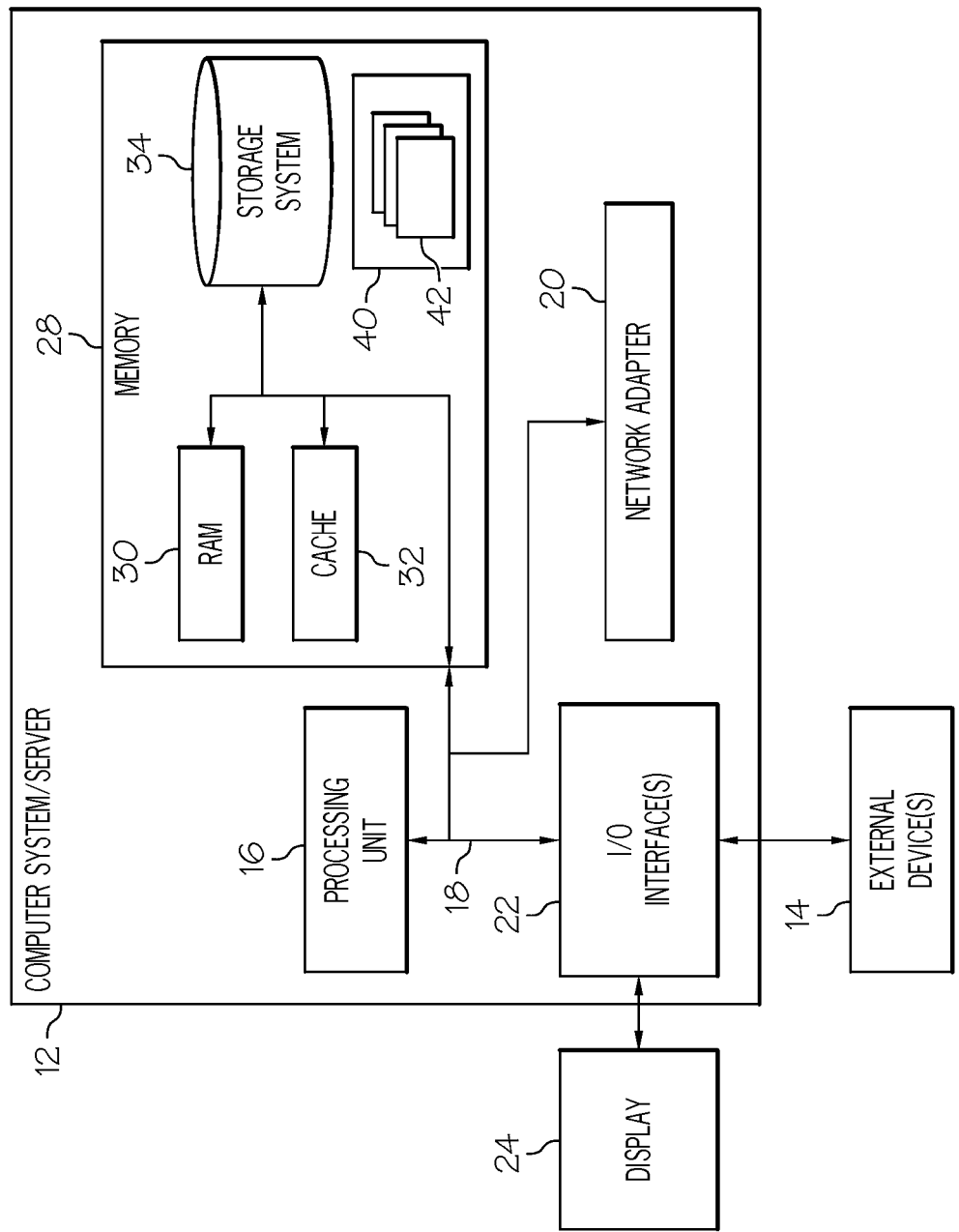
FIG. 1 depicts a cloud computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Exemplary embodiments now will be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Embodiments of the present invention provide an (intelligent) node controller (e.g., for an endpoint/node such as a cloud node) to process requests. Among other things, the node controller will read a request message from a cloud node queue that is associated with the endpoint (e.g., any type of node such as a computing node, a storage node, etc.). The request message typically includes details related to a request for cloud resources and/or services received from a consumer. The node controller executes program code in an attempt to process the request. As the request is being processed, the node controller can place state messages indicating a state of fulfillment of the request on a cloud manager queue that is associated with a cloud manager from which the request message was received. In addition, the node controller can update an audit database via an audit queue with the state messages. When a request cannot be processed, the node controller can place a failure message in a triage queue or the like.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating systems, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
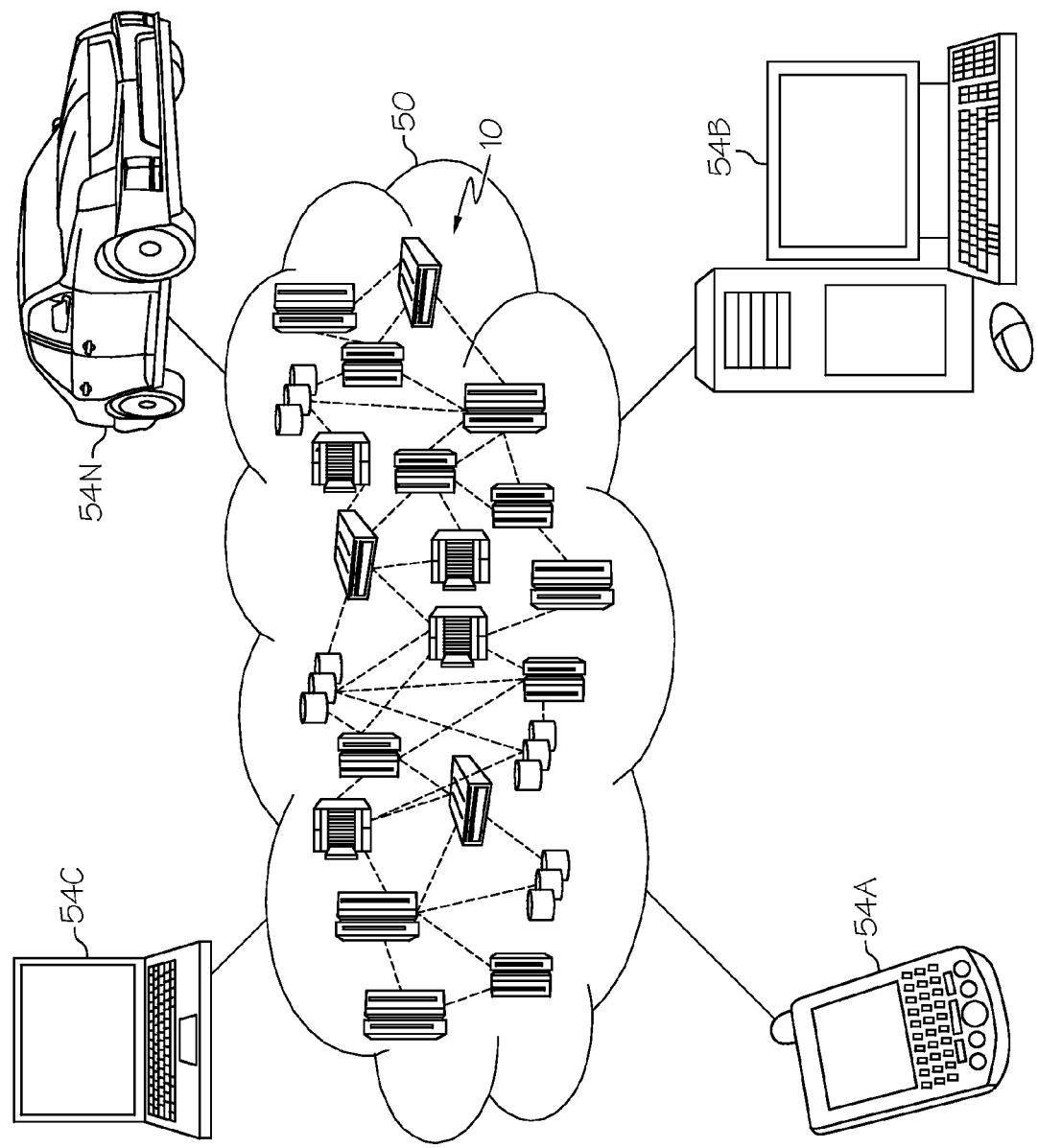
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
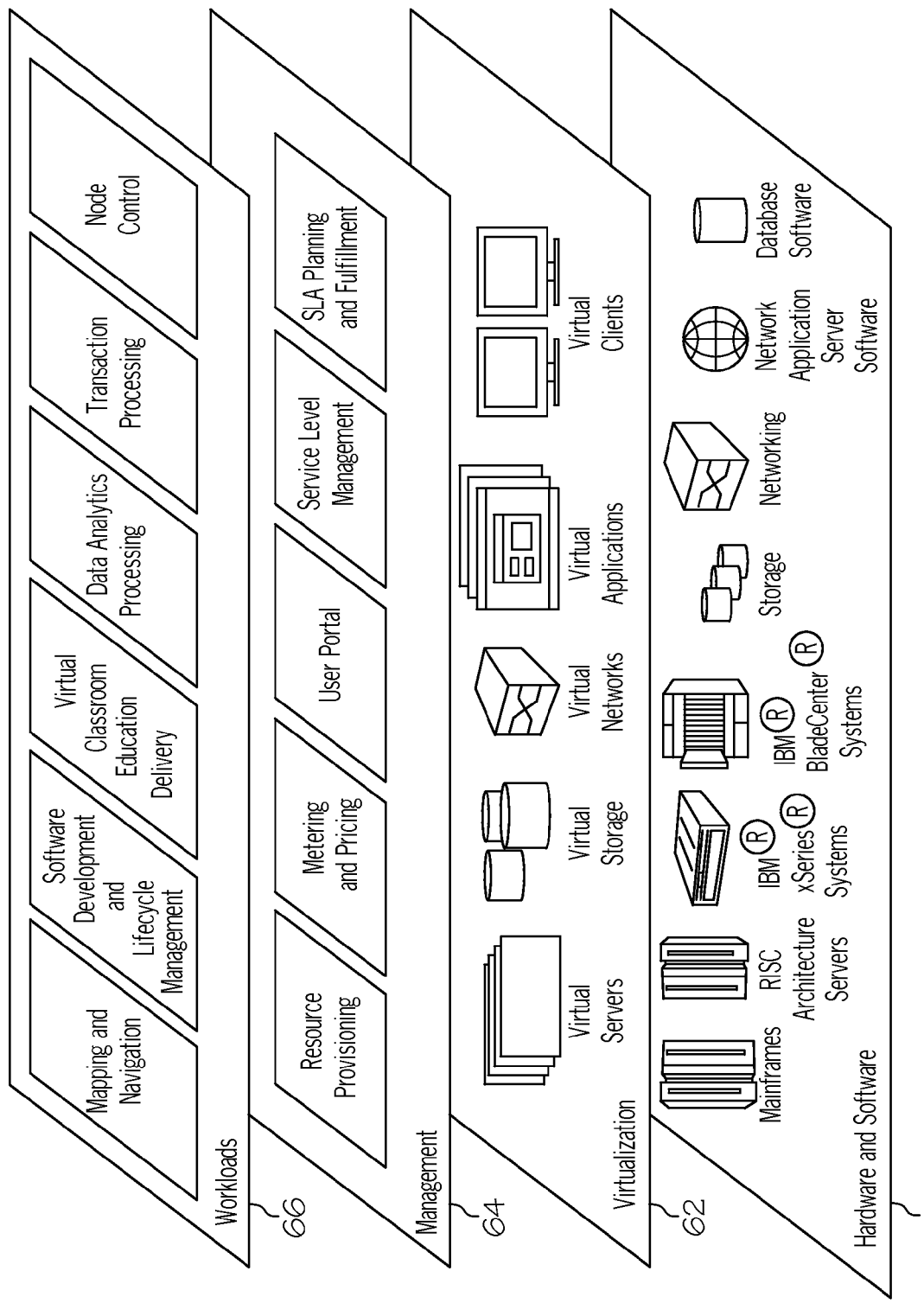
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM xSeries® systems, IBM BladeCenter® systems, storage devices, networks, and networking components. Examples of software components include network application server software. In one example, IBM WebSphere® application server software and database software. In one example, IBM DB2® database software. (IBM, zSeries, pSeries, xSeries, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and node control. As mentioned above, all of the foregoing examples described with respect to FIG. 3 are illustrative only, and the invention is not limited to these examples.

It is understood all functions of the present invention as described herein are typically performed by the node control, which can be tangibly embodied as modules of program code 42 of node control program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of clustered computing environment now known or later developed.

Figure 4:
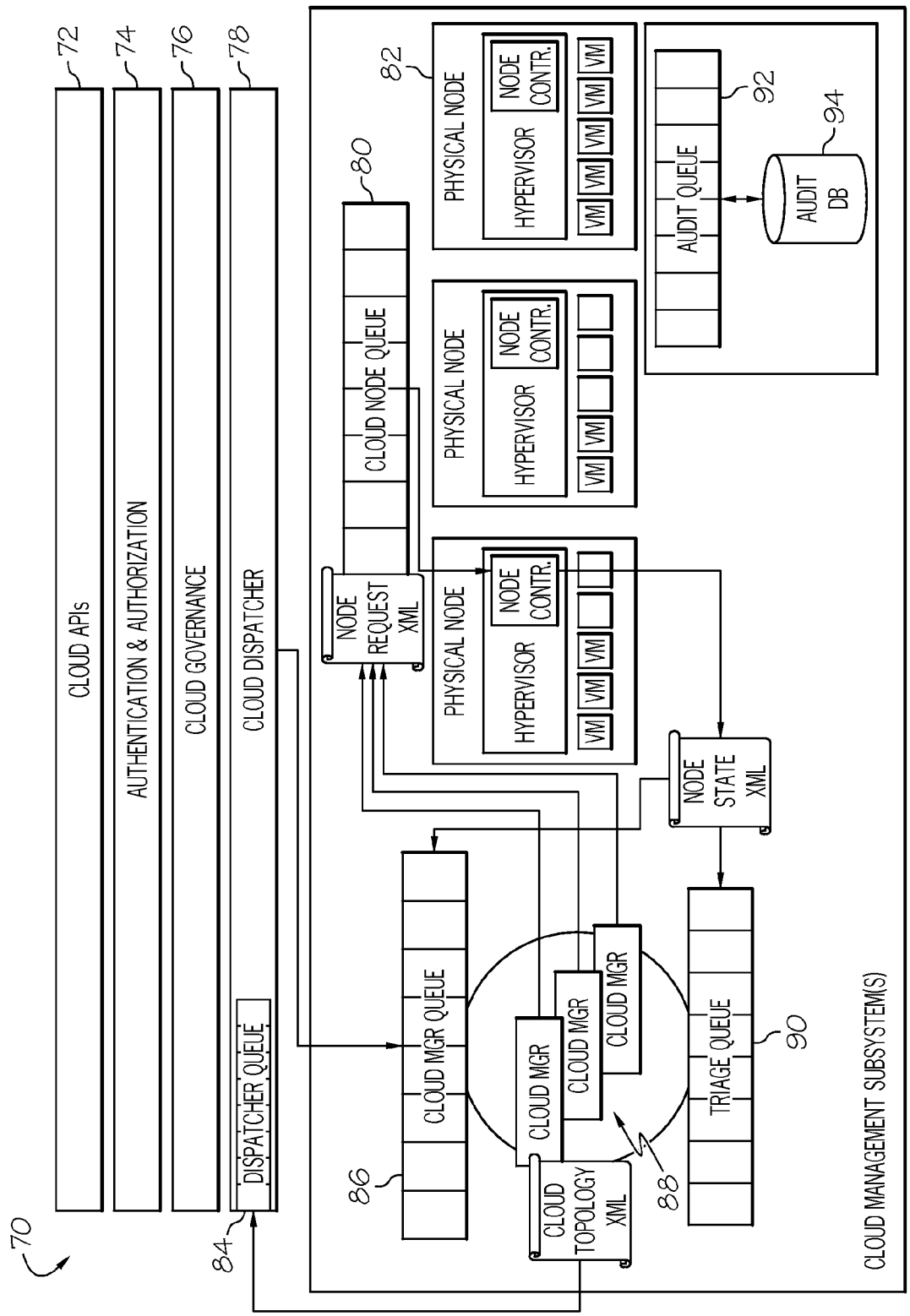
FIG. 4 depicts a request processing system according to an embodiment of the present invention.

Referring now to FIG. 4, a system 70 for distributed processing of requests according to an embodiment of the present invention is shown. In general, a request will be received from a consumer or the like via Application Programming Interfaces (APIs) 72. When a request is received, authentication and authorization layer 74 will authenticate the consumer. Moreover, cloud governance layer 76 can provide overall management/governance for the cloud computing environment. It is understood that these layers can be implemented as shown in FIG. 3. They are shown as such in FIG. 4 for illustrative purposes only. Regardless, cloud dispatcher 78 comprises logic to process cloud requests and makes available cloud services, which are provided as a set of web services. Moreover, cloud dispatcher 78 processes the request from the consumer for cloud resources and places a corresponding message on a cloud manager queue 86 that itself is associated with a set of cloud managers 88. The messages may be directed to a specific cloud resource or be directed in general to any resource that can satisfy the request. Cloud manager queue 86 typically holds messages for processing by cloud managers 88. The cloud managers 88 make local placement determinations for execution by physical/cloud nodes 82 (which was also represented as node 10 of FIGS. 1 and 2). These decisions include whether a specific node needs to process a request or if a request can be generically serviced by any node that fulfills the requirements of the request.

The message will be routed to a cloud node queue 80 that is associated with a set of physical cloud nodes/endpoints 82. Under the embodiments of the present invention, cloud nodes 82 can be any type of node (e.g., computer nodes, storage nodes, etc.). As shown, each cloud node 82 can comprise a hypervisor, a node controller (which will be further described in conjunction with FIG. 5) and a set of virtual machines (VMs). Cloud node queue 80 holds messages for processing by cloud nodes 82 via the node controller. The messages may be directed to a specific endpoint or may be generic in nature whereby any cloud node 82 can process the request. If a cloud node 82's controller successfully executes a request, the controller places a state message to that effect into cloud manager queue 86 indicating a state of fulfillment of the request.

Along these lines, a cloud node 82 processes requests, executes code to satisfy the needs of the requests, and updates the cloud audit database 94 directly to update the state of the cloud resource. Along these lines, audit database 94 is associated with an audit queue 92 that holds any state or processing messages and logs the messages in permanent storage for auditing purposes.

As further shown, system 70 comprises a dispatcher queue 84 that is responsible for transmitting state information of the underlying cloud(s) from the cloud manager(s) 88 to cloud dispatcher 78. The cloud dispatcher 78 uses information on the queue to make dispatching determinations on where to place incoming requests. In addition, a triage queue 90 is shown, which represents a holding location for processing of failed requests. In failure scenarios, a cloud node 82's node controller places a failure message on the triage queue 90 for special processing and error recovery. As shown in FIG. 4 each message placed in the various queues can be in Extensible Markup Language (XML) format.

Figure 5:
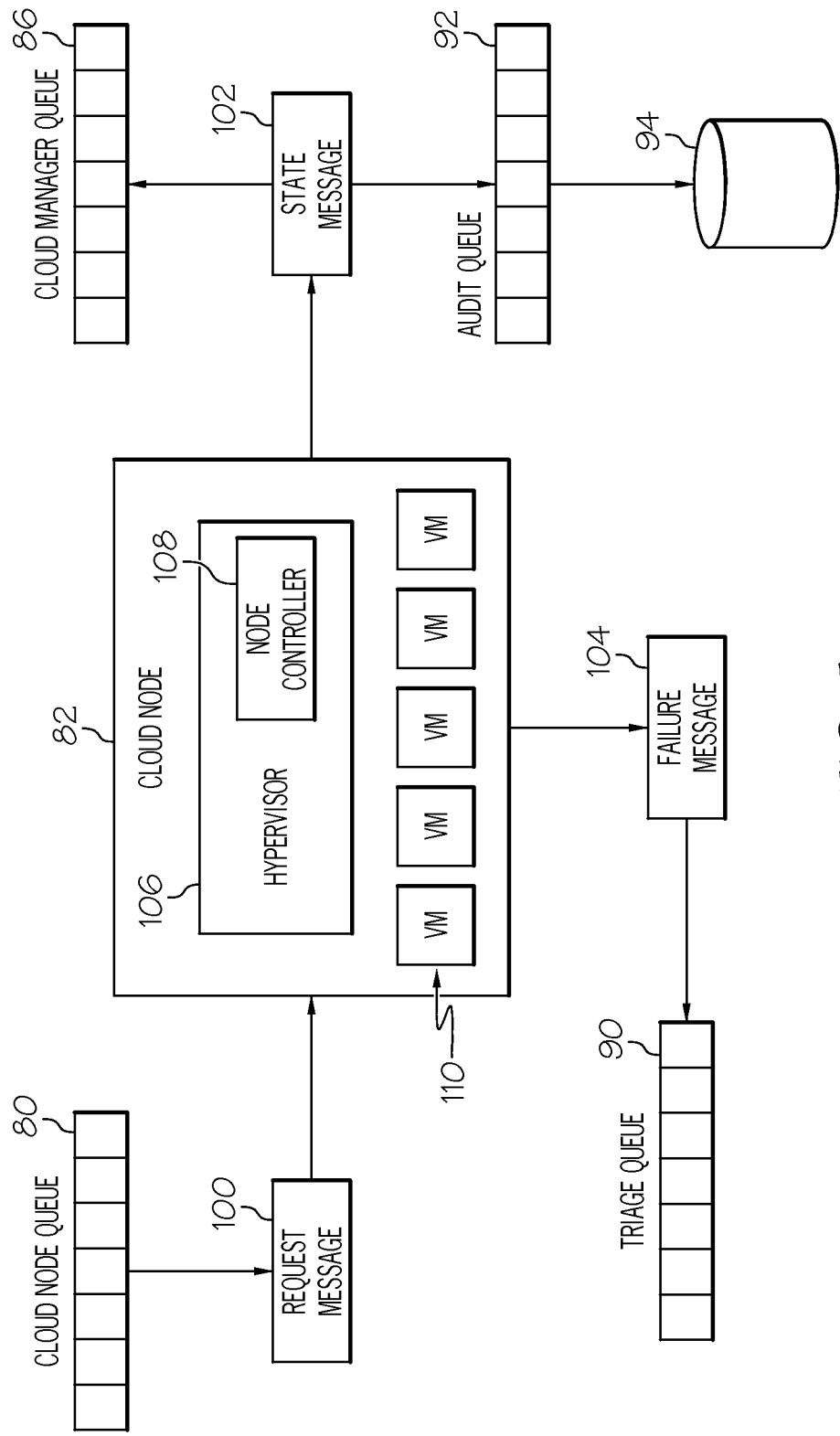
FIG. 5 depicts a component flow diagram according to an embodiment of the present invention.

Referring now to FIG. 5, the functions of node/endpoint 82 and node controller 108 can comprise node control program utility 40 shown in FIG. 1. In general, node controller 108 provides communication and execution logic on the endpoint 82. Along these lines, endpoint 82 may receive a direct request from a cloud controller or retrieve open requests from a queue such as cloud node queue 80. It is understood that an endpoint reference is not limited to just computing resources in the cloud. Rather, the reference may also be used to reference storage devices, network devices, etc.

In general, endpoints that can satisfy requests for cloud resources are self sufficient and contain code to process requests received from cloud node queue 80. Along these lines, the following is one example of how requests can be processed in accordance with at least one embodiment of the present invention. As show in FIG. 5, cloud node 82 can include a node controller 108 contained within a hypervisor 106, as well as a set (e.g., at least one) of virtual machines (VMs) 110. In a typical embodiment, a request message 100 (e.g., associated with a request from a consumer) will be read from cloud node queue 80 by node controller 108. Node controller 108 will then execute program code to process the request associated with request message 100. This typically includes attempting to fulfill the request by provisioning/allocating cloud resources and/or services. As the request is being processed, node controller 108 can place a state message 102 indicating a state of fulfillment of the request on cloud manager queue 86 (e.g., associated with cloud managers 88 of FIG. 4) from which the request message was received. In addition, node controller 108 can place the state message in audit queue 92 associated with audit database 94. When a request cannot be processed, node controller 108 can place a failure message 104 in triage queue 90. Along these lines, illustrative actions that may be performed by cloud node 82 via node controller 108 include, but are not limited to: retrieving images and/or instances from an image catalog system; starting, stopping, destroying, and/or creating virtual machines; creating firewall rules; creating Logical Unit Numbers (LUNs); etc.

Figure 6:
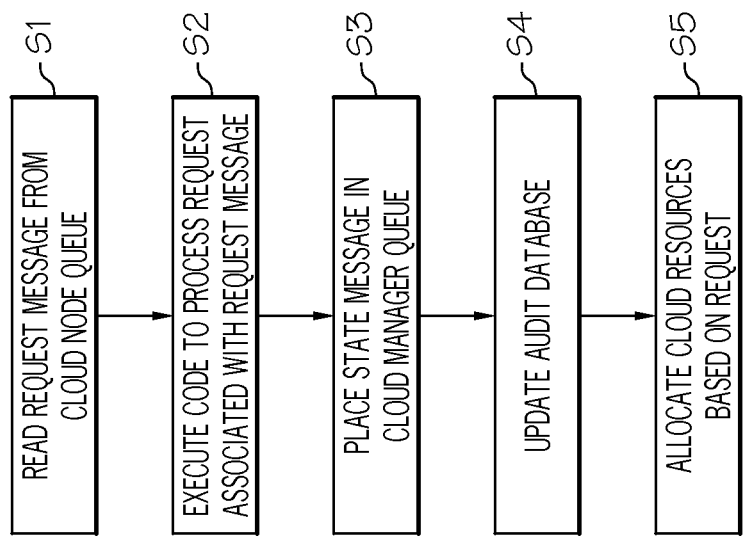
FIG. 6 depicts a method flow diagram according to an embodiment of the present invention.

Referring now to FIG. 6, a method flow diagram according to the present invention is shown. As depicted in step S1, a request message is read from a cloud node queue. In step S2, code is executed to process a request associated with the request message. In step S3, a state message indicating a state of fulfillment of the request is placed in a cloud manager queue. In step S4, an audit database is updated to reflect the state. In step S5, cloud resources are allocated if the request can be successfully fulfilled.

While shown and described herein as an intelligent node control solution, it is understood that the invention further provides various alternative embodiments. For example, in one embodiment, the invention provides a computer-readable/useable medium that includes computer program code to enable a computer infrastructure to provide intelligent node control functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide intelligent node control functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for intelligent node control. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. An intelligent node controller method for an endpoint in a cloud computing environment, comprising:
   receiving, from a consumer, a request message in a cloud manager queue, the request message comprising a request for at least one of cloud resources and cloud services;
   determining, by a cloud manager, a node controller for processing the request message, the node controller being contained within a hypervisor of an endpoint comprising a set of virtual machines, wherein the node controller provides execution logic on the endpoint;
   placing the request message in a cloud node queue for the determined node controller;
   reading, by the node controller, the request message in the cloud node queue;
   selecting, by the node controller, at least one of the set of virtual machines to process a request associated with the request message;
   executing, by the node controller, program code via the execution logic to process the request at the endpoint via the at least one of the set of virtual machines, the processing the request comprising provisioning the at least one of cloud resources and cloud services;
   placing, by the node controller, a state message indicating a state of fulfillment of the request on the cloud manager queue; and
   placing, by the node controller, a failure message in a triage queue if the request cannot be processed by the node controller;
   wherein the cloud node queue, the cloud manager queue, and the triage queue are contained within separate entities;
   wherein the node controller comprises at least one computing device.

2. The intelligent node controller method of claim 1, wherein the endpoint comprises at least one cloud node, and the node controller works in conjunction with the hypervisor.

3. The intelligent node controller method of claim 1, further comprising updating a cloud manager queue to reflect the state of fulfillment.

4. The intelligent node controller method of claim 1, the request message being received in the cloud manager queue from a cloud dispatcher prior to being received in the cloud node queue.

5. The intelligent node controller method of claim 1, the request comprising a request from a consumer for cloud resources.

6. The intelligent cloud node method of claim 5, further comprising authenticating a user prior to receiving the request message.

7. An intelligent node controller system for an endpoint in a cloud computing environment, comprising:
   a bus;
   a processor coupled to the bus; and
   a memory medium coupled to the bus, the memory medium comprising instructions to:
      receive, from a consumer, a request message in a cloud manager queue, the request message comprising a request for at least one of cloud resources and cloud services;
      determine a node controller for processing the request message, the node controller being contained within a hypervisor of an endpoint comprising a set of virtual machines, wherein the node controller provides execution logic on the endpoint;
      place the request message in a cloud node queue for the determined node controller;
      read, by the node controller, the request message in the cloud node queue;
      select, by the node controller, at least one of the set of virtual machines to process a request associated with the request message;
      execute, by the node controller, program code via the execution logic to process the request at the endpoint via the at least one of the set of virtual machines, the processing the request comprising provisioning the at least one of cloud resources and cloud services;
      place, by the node controller, a state message indicating a state of fulfillment of the request on the cloud manager queue; and
      place, by the node controller, a failure message in a triage queue if the request cannot be processed by the node controller;
      wherein the cloud node queue, the cloud manager queue, and the triage queue are separate queue.

8. The intelligent node controller system of claim 7, wherein the endpoint comprises at least one cloud node, and wherein the node controller works in conjunction with the hypervisor.

9. The intelligent node controller system of claim 7, the memory medium further comprising instructions to update a cloud manager queue to reflect the state of fulfillment.

10. The intelligent node controller system of claim 7, the request message being received in the cloud manager queue from a cloud dispatcher prior to being received in the cloud node queue.

11. The intelligent node controller system of claim 7, the request comprising a request from a consumer for cloud resources.

12. The intelligent node controller system of claim 11, the memory medium further comprising instructions to authenticate a user prior to receiving the request message.

13. A computer program product for intelligent node control of an endpoint in a cloud computing environment, the computer program product comprising a non-transitory computer readable storage media, and program instructions stored on the computer readable storage media, to:
   receive, from a consumer, a request message in a cloud manager queue, the request message comprising a request for at least one of cloud resources and cloud services;
   determine a node controller for processing the request message, the node controller being contained within a hypervisor of an endpoint comprising a set of virtual machines, wherein the node controller provides execution logic on the endpoint;
   place the request message in a cloud node queue for the determined node controller;
   read, by the node controller, the request message in the cloud node queue;
   select, by the node controller, at least one of the set of virtual machines to process a request associated with the request message;
   execute, by the node controller, program code via the execution logic to process the request at the endpoint via the at least one of the set of virtual machines, the processing the request comprising provisioning the at least one of cloud resources and cloud services;
   place, by the node controller, a state message indicating a state of fulfillment of the request on the cloud manager queue; and place, by the node controller, a failure message in a triage queue if the request cannot be processed by the node controller; and wherein the cloud node queue, the cloud manager queue, and the triage queue are separate queues.

14. The computer program product of claim 13, wherein the endpoint comprises at least one cloud node, and wherein the node controller works in conjunction with the hypervisor.

15. The computer program product of claim 13, further comprising program instructions stored on the non-transitory computer readable storage media to update a cloud manager queue to reflect the state of fulfillment.

16. The computer program product of claim 13, the request message being received in the cloud manager queue from a cloud dispatcher prior to being received in the cloud node queue.

17. The computer program product of claim 13, the request comprising a request from a consumer for cloud resources.

18. The computer program product of claim 17, further comprising program instructions stored on the non-transitory computer readable storage media to authenticate a user prior to receiving the request message.

19. A method for deploying a system for intelligent node control of an endpoint in a cloud computing environment, comprising:

deploying a computer infrastructure being operable to:

receive, from a consumer, a request message in a cloud manager queue, the request message comprising a request for at least one of cloud resources and cloud services;

determine a node controller for processing the request message, the node controller being contained within a hypervisor of an endpoint comprising a set of virtual machines, wherein the node controller provides execution logic on the endpoint;

place the request message in a cloud node queue for the determined node controller;

read, by the node controller, the request message in the cloud node queue;

select, by the node controller, at least one of the set of virtual machines to process a request associated with the request message;

execute, by the node controller, program code via the execution logic to process the request at the endpoint via the at least one of the set of virtual machines, the processing the request comprising provisioning the at least one of cloud resources and cloud services;

place, by the node controller, a state message indicating a state of fulfillment of the request on the cloud manager queue; and place, by the node controller, a failure message in a triage queue if the request cannot be processed by the node controller; and wherein the cloud node queue, the cloud manager queue, and the triage queue are separate queues.

* * * * *

UNITED STATES PATENT AND TRADEMARK OFFICE
CERTIFICATE OF CORRECTION

PATENT NO. : 8,800,055 B2  
APPLICATION NO. : 12/908132  
DATED : August 5, 2014  
INVENTOR(S) : Shaun T. Murakami et al.

Page 1 of 1

It is certified that error appears in the above-identified patent and that said Letters Patent is hereby corrected as shown below:

On the title page

Item (45) please insert --*-- before Aug. 5, 2014.

Item (*) please insert the following paragraph --This patent is subject to a terminal disclaimer--.

Signed and Sealed this
Seventh Day of April, 2015

Michelle K. Lee
*Director of the United States Patent and Trademark Office*